United States Patent
Sellers (10) Patent No.: US 7,907,393 B2
(45) Date of Patent: Mar. 15, 2011

(54) DISPLAY SUPPORT FOR A CLAMSHELL ELECTRONIC DEVICE

(75) Inventor: Charles A Sellers, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/431,273

(22) Filed: Apr. 28, 2009

(65) Prior Publication Data

US 2010/0271770 A1     Oct. 28, 2010

(51) Int. Cl.
*H05K 5/00* (2006.01)
*A47B 97/00* (2006.01)
*G05F 3/02* (2006.01)
*H04M 1/00* (2006.01)

(52) U.S. Cl. .................. 361/679.27; 345/168; 345/169; 312/223.2; 312/223.1; 361/679.2; 361/679.09; 455/575.1; 455/575.3; 455/575.4

(58) Field of Classification Search .................. 361/679.26–679.29, 679.55–679.59, 679.01–679.09; 248/917; 345/165, 905, 156, 157, 168, 169, 345/184, 917; 349/58, 65; 312/223.1; 455/325, 455/556.1, 550.1, 90.1, 575.1, 575.3, 575.4, 455/575.8; 200/329; 174/535; 29/557; 70/357, 70/367, 406, 381, 491
See application file for complete search history.

(56) References Cited

U.S. PATENT DOCUMENTS

| | | | |
|---|---|---|---|
| 5,200,913 A | 4/1993 | Hawkins et al. | |
| 5,375,076 A | 12/1994 | Goodrich et al. | |
| D394,848 S | 6/1998 | Riddiford | |
| 6,870,730 B2 | 3/2005 | Riddiford | |
| 7,239,505 B2 | 7/2007 | Keely et al. | |
| 7,333,323 B1* | 2/2008 | Dawson et al. | 361/679.27 |
| 7,355,843 B2 | 4/2008 | Riddiford | |
| 7,400,498 B2 | 7/2008 | Liang et al. | |
| 7,489,503 B2* | 2/2009 | Maatta | 361/679.27 |
| 2005/0083311 A1* | 4/2005 | Riddiford | 345/173 |
| 2008/0002355 A1* | 1/2008 | Carnevali | 361/686 |

* cited by examiner

*Primary Examiner* — Zachary M Pape
*Assistant Examiner* — Jerry Wu
(74) *Attorney, Agent, or Firm* — Michael S. Czarnecki (57) ABSTRACT

A clamshell electronic device provided. A first hinge having a first centerline along the axis of rotation of the first hinge can be disposed on a base member. A second hinge having a second centerline along the axis of rotation of the second hinge can be disposed on a keyboard member connecting a display member to the keyboard member. The keyboard member can be slideably connected to the base member. The keyboard member can be continuously reversibly slideable from a first position to a second position. The first and second centerlines can be axially aligned when the keyboard member is in the first position. A rigid support member having a first end and a second end can be pivotably connected to the base member at the first end and pivotably connected to the display member via a third hinge at the second end.

20 Claims, 5 Drawing Sheets

DISPLAY SUPPORT FOR A CLAMSHELL ELECTRONIC DEVICE

BACKGROUND OF THE INVENTION

Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of any prior art.

Input devices, those that enable a user to enter data on a computing device, have evolved with time from the simple typewriter-like devices found on the earliest computers to the more complex, external, pointing devices such as a track ball, a joystick, or a mouse. Similarly, output devices, those that enable a user to perceive data on a computing device, have evolved from simple paper output devices, to cathode ray tube (CRT) displays, to thin panel light emitting diode (LED), liquid crystal (LCD), and gas plasma displays. A more recent innovation is combining one or more input devices with one or more output devices to provide a device suitable both for the entry and display of digital or analog data. Such devices are typified by the current generation CRT, LED, LCD, and plasma touch-sensitive displays. Data entry on systems using touch-sensitive displays can usually be performed via fingertip, pen or stylus. Generally, touchscreen displays are securely braced to absorb the pressure exerted by the user as data is entered into the system. Clamshell type electronic devices, such as portable computers, personal digital assistants and cellular telephones however may not have sufficient stability for the user to enter data on a touch-sensitive display disposed at least partially within the device.

SUMMARY OF THE INVENTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

A clamshell electronic device provided. A first hinge having a first centerline along the axis of rotation of the hinge can be disposed on a base member. A second hinge having a second centerline along the axis of rotation of the hinge, and connecting a display member to a keyboard member can be disposed on the keyboard member. The keyboard member can be slideably connected to the base member. The keyboard member can be continuously, reversibly, slideable from a first position to a second position. The first and second centerlines can be axially aligned when the keyboard member is in the first position. A rigid support member having a first end and a second end can be pivotably connected to the base member at the first end and pivotably connected to the display member via a third hinge at the second end.

As used herein, the terms "continuously translate," "continuously translated," and "continuously translatable" refer to the ability to smoothly, uniformly, steadily, constantly, or unimpededly move, slide, position, or otherwise translate a member between a first position and any intermediate second position disposed or otherwise located within the full range of motion of the member. As used herein, a translatable member capable of being placed in one or more predetermined detent second positions can be considered "continuously translatable" if the member can be placed in one or more intermediate non-detent positions.

Another clamshell electronic apparatus is also provided. At least one first hinge can be adapted to pivotably connect a base member to a support member along a first centerline defined by the axis of rotation of the first hinge. The support member can be a rigid member having a first end and a second end. At least one slideable connector can be adapted to slideably connect a keyboard member to the base member. The keyboard member can be continuously, reversibly, slideable between a first position and a second position. At least one second hinge can be adapted to pivotably connect a display member to the keyboard member along a second centerline defined by the axis of rotation of the hinge. The first centerline and the second centerline can be aligned with the keyboard member disposed in the first position. At least one third hinge can be adapted to pivotably connect the second end of the support member to the display member.

A clamshell portable computer housing is also provided. An at least partially hollow, generally rectangular parallelepiped, base member having generally planar upper, lower, and side surfaces can be provided. In one or more embodiments, the upper and lower surfaces of the base member 110 can have a greater surface area than the side surface. At least one central processing unit (CPU) can be at least partially disposed in the base member. A first hinge can be disposed on the upper surface of the base member, at least a portion of the first hinge proximate at least one of the side surfaces of the base member. A first centerline can be formed along the axis of rotation of the hinge. An at least partially hollow, generally rectangular parallelepiped, keyboard member having generally planar upper, lower, and side surfaces can be provided where a keyboard and a pointing device are at least partially disposed on the upper surface of the keyboard member. The upper and lower surfaces of the keyboard member can generally correspond in size and/or shape to the upper surface of the base member. At least a portion of the lower surface of the keyboard member can be disposed proximate at least a portion of the upper surface of the base member. The keyboard member can be slideably connected to the base member, where the keyboard member can be continuously, reversibly, slideable from a first position to a second position. A second hinge can be disposed on the upper surface of the keyboard member, at least a portion of the second hinge proximate at least one of the side surfaces of the keyboard member. An at least partially hollow, generally rectangular parallelepiped, display member having generally planar upper, lower, and side surfaces can be provided where a liquid crystal display (LCD) can be at least partially disposed within the display member. The LCD can be selected from the group of LCDs consisting of: a pen-input LCD; a touch-sensitive LCD; and a digitizer input LCD. The upper and lower surfaces of the display member can correspond generally in size to the upper surface of the keyboard member. The display member can be pivotably connected to the keyboard member via the second hinge. A rigid support member having a first end and a second end can be pivotably connected to the base member via the first hinge and the second end can be pivotably connected to the display member via a third hinge. At least a portion of the support member can be disposed at least partially within a recessed portion of the display member when the keyboard member is in the first position. The support member can form an angle of from about 30° to less than 90° with respect to the base member with the keyboard member in the second position.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Advantages of one or more disclosed embodiments may become apparent upon reading the following detailed description and upon reference to the drawings in which.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
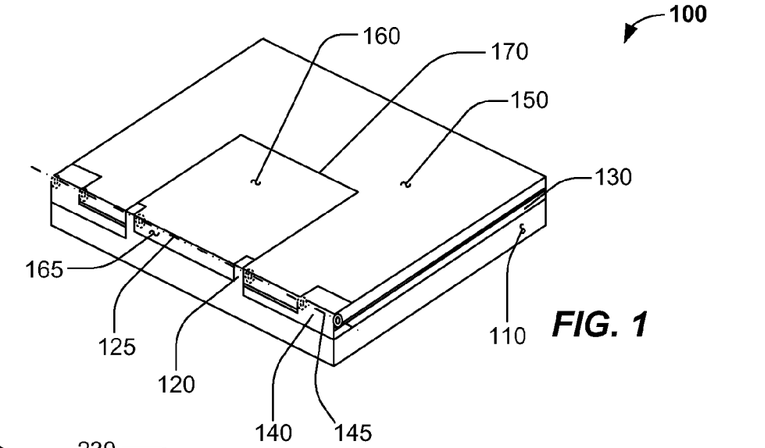
FIG. 1 is an isometric plan view depicting an illustrative closed clamshell electronic device according to one or more embodiments described herein.

FIG. 1 is an isometric plan view depicting an illustrative closed clamshell electronic device 100 according to one or more embodiments. In one or more embodiments, the clamshell electronic device 100 can include, but is not limited to, a base member 110. In one or more embodiments, one or more first hinges 120 can be disposed in, on, or about the base member 110, for example along an edge of the base member 110 as depicted in FIG. 1. In one or more embodiments, the first hinge 120 can define a first centerline 125 disposed along the axis of rotation defined by the first hinge 120. In one or more embodiments, a keyboard member 130 can be disposed proximate the base member 110. In one or more specific embodiments, the keyboard member 130 can be slideably connected to the base member 110. In one or more embodiments, one or more second hinges 140 can be disposed in, on, or about the keyboard member 130, for example along an edge of the keyboard member 130 as depicted in FIG. 1. In one or more embodiments, the second hinge 140 can define a second centerline 145 disposed along the axis of rotation defined by the second hinge 140. In one or more embodiments a display member 150 can be pivotably attached to the keyboard member 130 via the first hinge 140. In one or more embodiments, a support member 160 can be pivotably attached at a first end 165 to the second hinge 145, and pivotably attached at a second end 170 to the display member 150 using a third hinge.

In one or more embodiments, the base member 110 can have any shape or configuration suitable for housing a portable electronic device. In one or more embodiments, the base member 110 can be generally configured to provide at least one interior surface and at least one exterior surface. In one or more specific embodiments, the base member 110 can be an at least partially hollow, rectangular, parallelepiped, base member having generally planar upper, lower, and side surfaces. In one or more embodiments, the upper and lower surfaces of the base member 110 can have a greater surface area than the side surfaces, as depicted in FIG. 1. In one or more embodiments, the base member 110 can be of any size, shape, or configuration suitable for the disposal of one or more portable electronic devices at least partially therein. Suitable portable electronic devices can include, but are not limited to, portable computers, ultraportable computers, cellular devices, gaming devices, personal digital assistants (PDAs), and the like.

In one or more embodiments, the base member 110 can be a single piece or multipiece member, for example the base member 110 can be a single piece stamped metal housing, for example a stamped aluminum, titanium, steel, or stainless steel housing. In one or more embodiments, the base member 110 can be an molded, extruded, or stamped non-metallic member, for example a molded carbon fiber member, an extruded thermoplastic member, or the like. In one or more embodiments, the base member 110 can be a multipiece member, for example a carbon fiber member created by laminating, joining or otherwise bonding a plurality of sub-members to form the base member 110.

In one or more embodiments, one or more first hinges 120 can be disposed in, on, or about the base member 110. All or a portion of the one or more first hinges 120 can be discrete components or cast integrally with the base member 110. In one or more embodiments, all or a portion of the one or more first hinges 120 can be integrally formed with the base member 110. In one or more embodiments, all or a portion of the one or more first hinges 120 can be disposed along, one or more side surfaces forming the base member 110 as depicted in FIG. 1. In one or more embodiments, one or more pins or pivots can be disposed in, on, or about the one or more first hinges 120. In one or more embodiments, the one or more pins or pivots disposed in, on, or about the one or more first hinges 120 can define a first centerline 125 along the axis of rotation of the one or more first hinges 120. In one or more specific embodiments, the one or more first hinges 120 can include, but are not limited to, one or more friction hinges 120 as depicted in FIG. 1.

In one or more embodiments, the one or more first hinges 120 can include a single first hinge 120 disposed centrally about one or more sides forming the base member 110. In one or more embodiments, the one or more first hinges 120 can include a plurality of hinges evenly or unevenly disposed in, on, or about one or more surfaces forming the base member 110. In one or more embodiments, where a plurality of hinges form the one or more first hinges 120, the axes of rotation for the individual hinges forming the plurality of hinges can be co-linear, thereby forming a single, common, first centerline 125 along the axis of rotation of the plurality of hinges. In one or more specific embodiments, the one or more first hinges 120 can include, but are not limited to, one or more friction hinges sharing a common, coaxially aligned first centerline 125.

In one or more embodiments, the keyboard member 130 can have any shape or configuration suitable for housing one or more input devices, one or more output devices, or any combination thereof. Exemplary input devices can include, but are not limited to, one or more key-based entry devices, one or more touch sensitive entry devices, one or more pointer-based entry devices, or any combination or frequency thereof. In one or more embodiments, the keyboard member 130 can be generally configured to provide at least one interior surface and at least one exterior surface. In one or more specific embodiments, the keyboard member 130 can be an at least partially hollow, generally rectangular parallelepiped, base member having generally planar upper, lower, and side surfaces. In one or more embodiments, the upper and lower surfaces of the keyboard member 130 can have a greater surface area than the side surfaces, as depicted in FIG. 1. In one or more specific embodiments, the lower surface forming the keyboard member 130 can be similar in size, shape, and geometry to the upper surface forming the base member 110. In one or more specific embodiments, the lower surface forming the keyboard member 130 can be disposed proximate the base member 110. In one or more embodiments, one or more slideable connectors can slideably connect the keyboard member 130 with the base member 110.

In one or more embodiments, the keyboard member 130 can be a single piece or multipiece member, for example the keyboard member 130 can be a single piece stamped metal housing, for example a stamped aluminum, titanium, steel, or stainless steel housing. In one or more embodiments, the keyboard member 130 can be an molded, extruded, or stamped non-metallic member, for example a molded carbon fiber member, an extruded thermoplastic member, or the like. In one or more embodiments, the keyboard member 130 can be a multipiece member, for example a carbon fiber member created by laminating joining or otherwise bonding a plurality of sub-members to form the keyboard member 130.

In one or more embodiments, one or more second hinges 140 can be disposed in, on, or about the keyboard member 130. All or a portion of the one or more second hinges 140 can be discrete or integral components formed with or otherwise attached to the keyboard member 130. In one or more embodiments, all or a portion of the one or more second hinges 140 can be integrally cast with, and disposed along, one or more side surfaces of the keyboard member 130 as depicted in FIG. 1.

In one or more embodiments, one or more pins or pivots can be disposed in, on, or about the one or more second hinges 140. In one or more embodiments, the one or more pins or pivots disposed in, on, or about the one or more second hinges 140 can define a second centerline 145 along the axis of rotation formed by the one or more second hinges 140. In one or more specific embodiments, the one or more second hinges 140 can include, but are not limited to, one or more friction hinges 140 as depicted in FIG. 1.

In one or more embodiments, the one or more second hinges 140 can include a single second hinge 140 disposed centrally about one or more sides forming the keyboard member 130. In one or more embodiments, the one or more second hinges 140 can include a plurality of hinges evenly or unevenly disposed in, on, or about one or more surfaces forming the keyboard member 130. In one or more embodiments, where a plurality of hinges form the one or more second hinges 140, the axes of rotation for the individual hinges forming the plurality of hinges can be co-linear, thereby forming a single, common, second centerline 145 along the axis of rotation of the plurality of hinges. In one or more specific embodiments, the one or more second hinges 140 can include, but are not limited to, one or more friction hinges sharing a common, coaxially aligned, second centerline 145.

In one or more embodiments, the display member 150 can have any shape or configuration suitable for housing one or more input devices, one or more output devices, or any combination thereof. In one or more embodiments, the display member 150 can be generally configured to provide at least one interior surface and at least one exterior surface. In one or more specific embodiments, the display member 150 can be an at least partially hollow, generally rectangular parallelepiped, base member having generally planar upper, lower, and side surfaces. In one or more embodiments, the surface area of the upper and lower surfaces of the display member 150 can be greater than the surface area of the side surfaces, as depicted in FIG. 1.

In one or more specific embodiments, the lower surface forming the display member 150 can be similar in size, shape, or geometry to the upper surface forming the keyboard member 130. In one or more specific embodiments, the lower surface forming the display member 150 can be disposed proximate the keyboard member 130 when the clamshell electronic device is in a closed position, e.g. when the display member 150 is rotated to a position proximate the keyboard member 130. In one or more embodiments, the display member 150 can be pivotably connected to the keyboard member 130 via the one or more second hinges 140.

In one or more embodiments, the display member 150 can be a single piece or multipiece member, for example the display member 150 can be a single piece stamped metal housing, for example a stamped aluminum, titanium, steel, or stainless steel. In one or more embodiments, the display member 150 be an molded, extruded, or stamped non-metallic member, for example a molded carbon fiber member, an extruded thermoplastic member, or the like. In one or more embodiments, the display member 150 can be a multipiece member, for example a carbon fiber member created by laminating, joining, or otherwise bonding a plurality of sub-members to form the display member 150.

In one or more embodiments, the support member 160 can have any shape or configuration. In one or more specific embodiments, the support member 160 can be a rigid member having a first end 165 and a second end 170. In one or more embodiments, the first end 165 can be pivotably attached to the one or more first hinges 120. In one or more embodiments, the second end 170 can be pivotably attached to the display member 150 via one or more third hinges. In one or more specific embodiments, the support member 160 can be disposed proximate the display member 150 when the clamshell electronic device 100 is in the closed position as depicted in FIG. 1. In one or more specific embodiments, the support member 160 can be disposed proximate a recessed portion of the display member 150 when the clamshell electronic device 100 is in the closed position as depicted in FIG. 1.

In one or more embodiments, the support member 160 can be a single piece or multipiece member, for example the support member 160 can be a single piece stamped metal member, for example a stamped, extruded, or cast aluminum, titanium, steel, or stainless steel member. In one or more embodiments, the support member 160 can be an molded, extruded, or cast non-metallic member, for example a molded carbon fiber member, an extruded thermoplastic member, or the like. In one or more embodiments, the support member 160 can be a multipiece member, for example a carbon fiber member created by laminating, joining or otherwise bonding a plurality of sub-members to form the support member 160.

Figure 2:
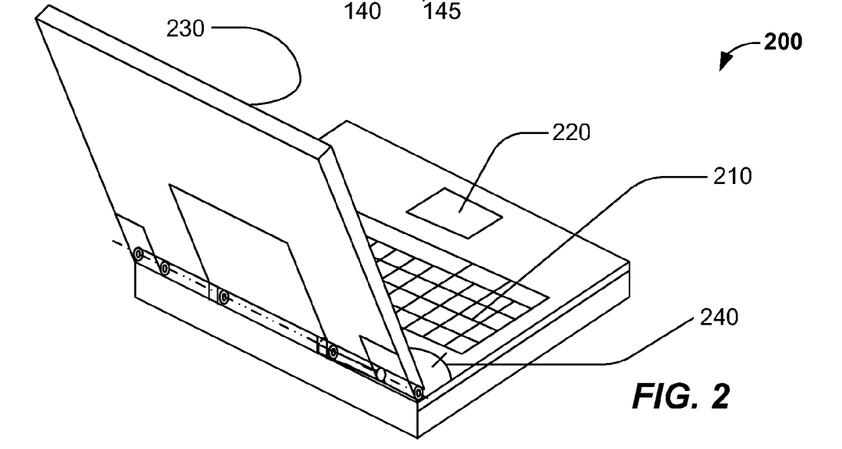
FIG. 2 is an isometric view depicting the illustrative clamshell electronic device depicted in FIG. 1 in an exemplary open position, with a keyboard member in an exemplary first position according to one or more embodiments described herein.

FIG. 2 is an isometric view depicting the exemplary clamshell electronic device 100 depicted in FIG. 1 in an illustrative open position, with the keyboard member 130 in an exemplary first position according to one or more embodiments. In one or more embodiments, pivoting the display member 150 through an angle 240 to the open position depicted in FIG. 2 can partially or completely expose one or more key-based input devices 210, one or more touchpads 220, one or more display devices 230, or any combination thereof.

In one or more embodiments, the display member 150 can be pivoted from the closed position depicted in FIG. 1 to the open position as depicted in FIG. 2 by rotating the member about the second hinge 140. In one or more specific embodiments, when the keyboard member 130 is in the first position, the first centerline 125 of the first hinge 120 and the second centerline 145 of the second hinge 140 can axially align thereby permitting the pivoting of the display member 150 about the first and second centerlines 125, 145.

In one or more embodiments, a key-based input device 210 can be disposed in, on, or about the keyboard member 130. In one or more embodiments, the key-based input device 210 can have any number of keys, ranging from the relatively few keys found on a typical cellular telephone or gaming device to the relatively great number of keys found on an exemplary QWERTY computer keyboard. In one or more embodiments, the key-based input device 210 can include one or more touch-sensitive input devices, for example a finger or stylus sensitive screen, digitizer, or the like.

In one or more embodiments, one or more pointing devices 220 can be disposed in, on, or about the keyboard member 130. In one or more embodiments, the one or more pointing devices 220 can include a touchpad, a mouse pointer, digitizer and the like. In one or more embodiments, the one or more pointing devices 220 can include one or more buttons, for example one or more "left" and "right" mouse buttons.

In one or more embodiments, one or more display devices 230 can be at least partially disposed in, on, or about the display member 150. In one or more embodiments, the one or more display devices 230 can include one or more input devices, for example, one or more touch sensitive displays, one or more audio capture or broadcast devices, one or more video capture or broadcast devices, or any combination thereof. In one or more embodiments, suitable display devices 230 can include, but are not limited to, one or more dedicated data output devices, such as a cathode ray tube (CRT) display; a light emitting diode (LED) display; an organic LED (OLED) display; a gas plasma display; and a liquid crystal display (LCD). In one or more specific embodiments, suitable display devices 230 can include one or more data input/output ("I/O") devices adapted to accommodate both the input and output of digital or analog data. Suitable I/O devices can include, but are not limited to, a digitizer input; a pen-sensitive cathode ray tube (CRT) display; a pen-sensitive light emitting diode (LED) display; a pen-sensitive organic LED (OLED) display; a pen-sensitive gas plasma display; a pen-sensitive liquid crystal display (LCD); a touch sensitive cathode ray tube (CRT) display; a touch sensitive light emitting diode (LED) display; a touch sensitive organic LED (OLED) display; a touch sensitive gas plasma display; and a touch sensitive liquid crystal display (LCD).

In one or more embodiments, the display member 150 can be pivoted about the one or more second hinges 140. In one or more embodiments, the angle 240 of the display member 150 measured with respect to the keyboard member 130 can be a minimum of about 0° when the display member 150 is in a closed position, for example the illustrative closed position depicted in FIG. 1. In one or more embodiments, when the display member 150 is in an open position, for example the illustrative open position depicted in FIG. 2, the display member 150 can form an angle 240 of about 90° or less; about 150° or less; about 180° or less; about 210° or less; about 250° or less; about 270° or less, measured with respect to the keyboard member 130.

Figure 3:
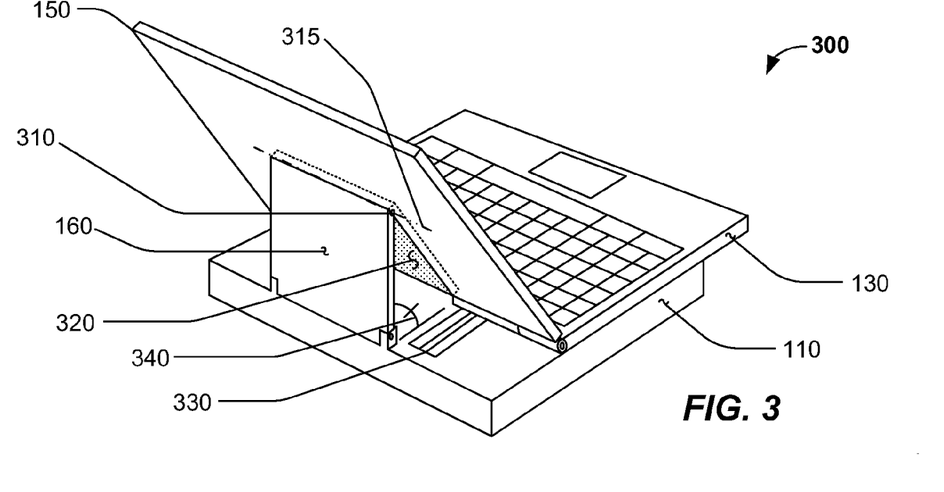
FIG. 3 is an isometric view depicting the illustrative clamshell electronic device depicted in FIG. 2 in an exemplary open position, with a keyboard member in an exemplary second position according to one or more embodiments described herein.

FIG. 3 is an isometric view depicting the illustrative clamshell electronic device 200 depicted in FIG. 2 in an exemplary open position, with a keyboard member 130 in an exemplary second position according to one or more embodiments. In one or more embodiments, the keyboard member 130 can be partially or completely displaced across the upper surface of the base member 110. As the keyboard member 130 is displaced across the base member 110, the support member 160 can pivot about the second hinge 125 and a third hinge 310 having an axis of rotation 315. In one or more embodiments, as the keyboard member 130 is displaced and as the support member 160 rotates about the first and third centerlines 125, 315, the support member 160 can be at least partially disposed on a plane skew to the principal plane of the display member 150. In one or more embodiments, a recess 320 at least partially housing or otherwise containing the support member 160 can be at least partially disposed in, on, or about the display member 150.

In one or more specific embodiments, the keyboard member 130 can be displaced across the upper surface of the base member 110 using one or more slideable connectors 330. In one or more embodiments, the one or more slideable connectors 330 can permit the linear displacement of the keyboard member 130 in a single direction. In one or more embodiments, the one or more slideable connectors 330 can permit the displacement of the keyboard member 130 in a plurality of directions.

In one or more embodiments, the keyboard member 130 can be displaced from the first position depicted in FIGS. 1 and 2 to the exemplary second position depicted in FIG. 3. As the keyboard member 130 is displaced, the support member 160 can pivot about the first and third hinges 120, 310. As the support member 160 pivots about the first hinge 120, the support member 160 can form an angle 340 with respect to the base member 110. In one or more embodiments, the angle 340 of the support member 160 measured with respect to the base member 110 can be a minimum of about 0° when the keyboard member 130 is in the first position and the display member 150 is in the closed position depicted in FIGS. 1 and 2. In one or more embodiments, the support member 160 can form an angle 340 of about 90° or less; about 75° or less; about 60° or less; or about 30° or less, measured with respect to the base member 110 when the keyboard member 130 is in the second position and the display member 150 is in the open position as depicted in FIG. 3. The angle 340 formed by the support member 160 can assist in preventing the rotation of the display member 150 about the one or more second hinges 140 when a user applies pressure to the display member 150, for example when the user touches a touch-sensitive I/O device 230 disposed at least partially within the display member 150 with a finger or stylus.

Figure 4:
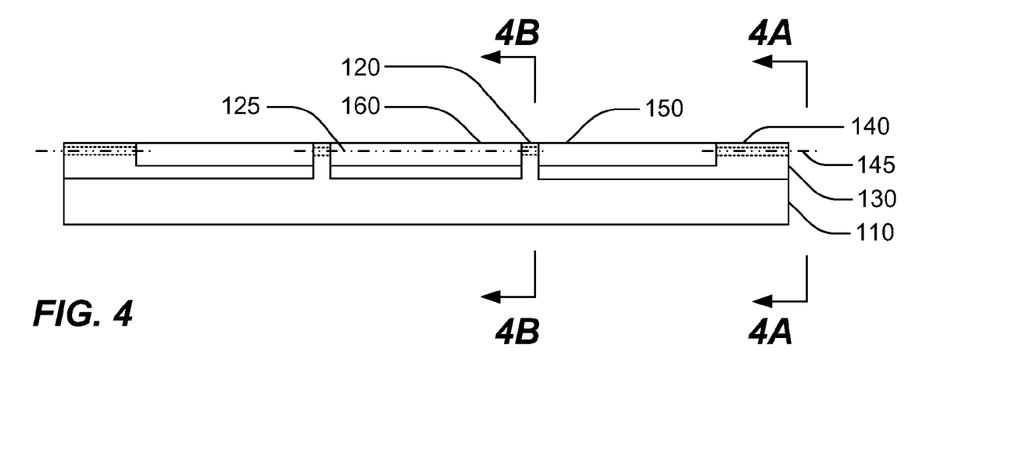
FIG. 4 is a rear elevation view depicting the illustrative closed clamshell electronic device depicted in FIG. 1 according to one or more embodiments described herein.
Figure 4A:
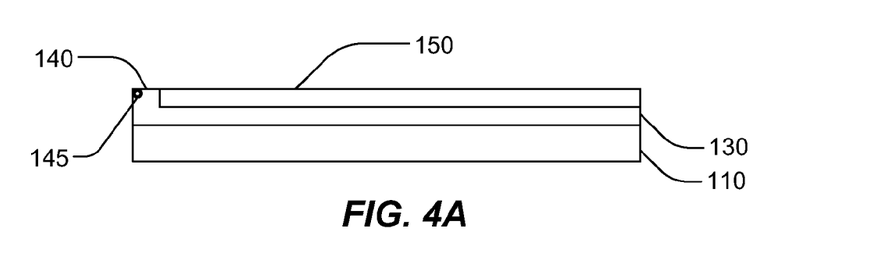
FIG. 4A is a cross sectional view depicting the cross section of the illustrative closed clamshell electronic device depicted in FIG. 4, along line 4A-4A according to one or more embodiments described herein.
Figure 4B:
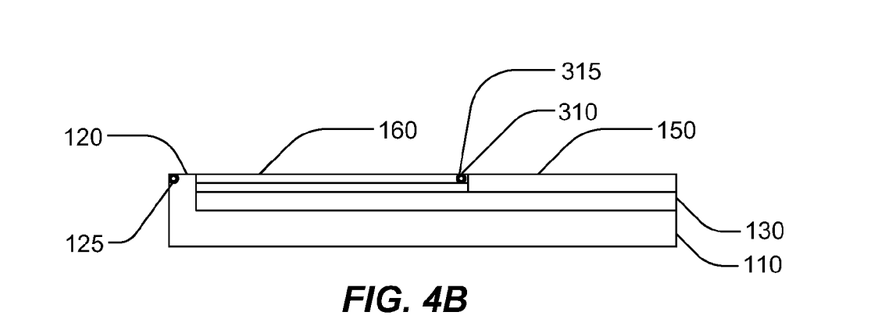
FIG. 4B is a cross sectional view depicting the cross section of the illustrative closed clamshell electronic device depicted in FIG. 4, along line 4B-4B, according to one or more embodiments described herein.

FIG. 4 is a rear elevation view depicting the illustrative closed clamshell electronic device 100 depicted in FIG. 1 according to one or more embodiments. FIG. 4A is a cross sectional view depicting the cross section of the illustrative closed clamshell electronic device 100 depicted in FIG. 4, along line 4A-4A according to one or more embodiments. FIG. 4B is a cross sectional view depicting the cross section of the illustrative closed clamshell electronic device 100 depicted in FIG. 4, along line 4B-4B, according to one or more embodiments. As depicted in FIG. 4, in one or more embodiments, the base member 110, keyboard member 130, and the display member 150 can be proximately disposed in parallel or substantially parallel planes when the clamshell electronic device 100 is in the closed position. When the base member 110, keyboard member 130, and the display member 150 are in the closed position, the first centerline 125 and the second centerline 145 can be coaxially aligned, i.e. the first centerline 125 and the second centerline 145 can be collinear.

Figure 5:
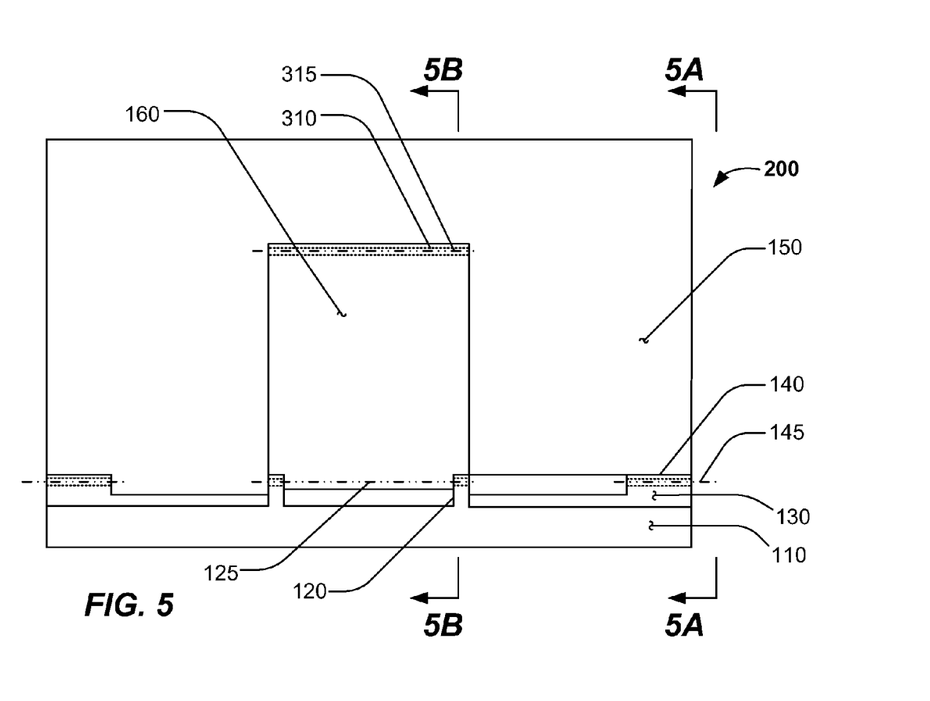
FIG. 5 is a rear elevation view depicting the exemplary open clamshell electronic device depicted in FIG. 2 in an illustrative first position, according to one or more embodiments described herein.
Figures 5A, 5B:
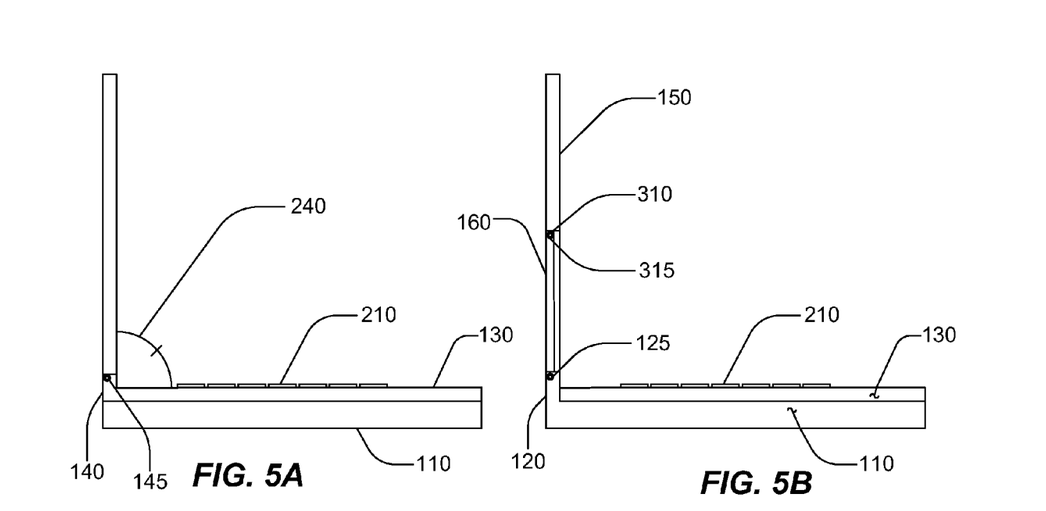
FIG. 5A is a cross sectional view of the exemplary open clamshell electronic device depicted in FIG. 5 in an illustrative first position, along line 5A-5A, according to one or more embodiments described herein.
FIG. 5B is a cross sectional view of the exemplary closed clamshell electronic device depicted in FIG. 5 in an illustrative first position, along line 5B-5B according to one or more embodiments described herein.

FIG. 5 is a rear elevation depicting the exemplary open clamshell electronic device 200 depicted in FIG. 2 in an illustrative first position, according to one or more embodiments. FIG. 5A is a cross sectional view depicting of the exemplary open clamshell electronic device 200 in an illustrative first position depicted in FIG. 5, along line 5A-5A, according to one or more embodiments. FIG. 5B is a cross sectional view depicting the exemplary closed clamshell electronic device 200 in an illustrative first position depicted in FIG. 5, along line 5B-5B according to one or more embodiments. In one or more embodiments, a user can rotate the display member 150 about the second centerline 145 of the second hinge 140 to the exemplary open position as depicted in FIG. 5A-B. In one or more embodiments, a user can rotate the display member 150 about the second centerline 145 of the second hinge 140 to an open position as depicted in FIG. 2. In one or more embodiments, the display member can be rotated to any angle 240 measured with respect to the keyboard member 130.

In one or more embodiments, when the keyboard member 130 is in the first position depicted in FIGS. 1, 2, and 5A-B, the support member 160 can be rotated about the first centerline 125 of the first hinge 120 simultaneous with rotation of the display member 150 about the second centerline of the second hinge 140. The simultaneous rotation of the display member 150 and the support member 160 can occur due to the coaxial alignment of the first centerline 125 of the first hinge 120 and the second centerline 145 of the second hinge 140. In one or more embodiments, as depicted in FIG. 5B, by maintaining the keyboard member 130 in the first position, the display member 150 and the support member 160 can be maintained in parallel, i.e. non-intersecting, planes throughout the full range of rotational motion of the display member 150.

Figure 6:
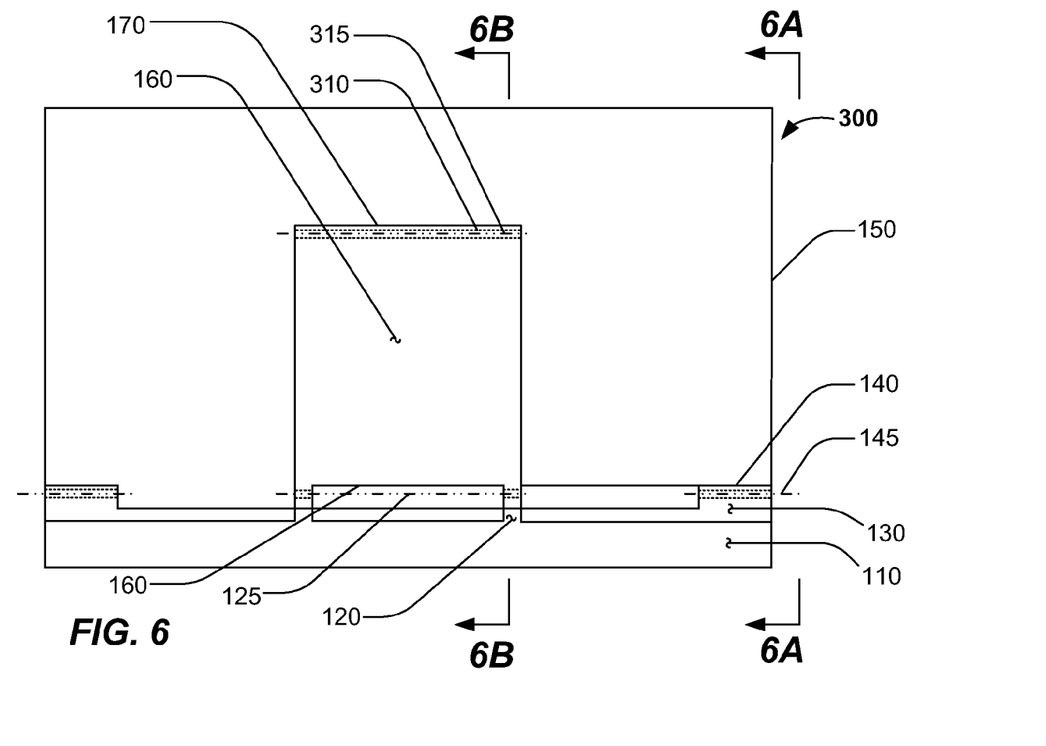
FIG. 6 is a rear elevation view depicting the exemplary open clamshell electronic device depicted in FIG. 3 in an illustrative second position, according to one or more embodiments described herein.
Figure 6A:
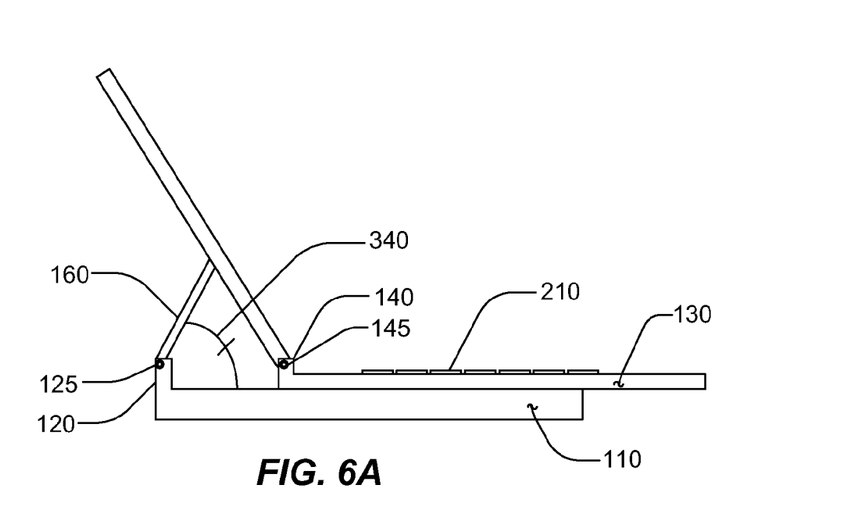
FIG. 6A is a cross sectional view of the exemplary open clamshell electronic device depicted in FIG. 6 along line 6A-6A in an illustrative second position, according to one or more embodiments described herein.
Figure 6B:
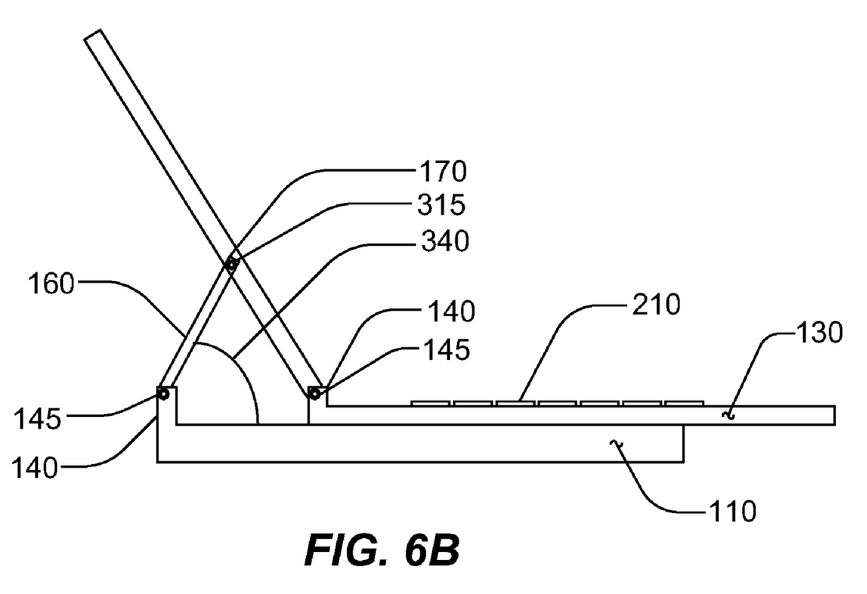
FIG. 6B is a cross sectional view of the illustrative closed clamshell electronic device depicted in FIG. 6, along line 6B-6B in an illustrative second position according to one or more embodiments described herein.

FIG. 6 is a rear elevation depicting the exemplary open clamshell electronic device 300 depicted in FIG. 3 in an illustrative second position, according to one or more embodiments. FIG. 6A is a cross sectional view of the exemplary open clamshell electronic device 300 depicted in FIG. 6 in an illustrative second position, along line 6A-6A, according to one or more embodiments. FIG. 6B is a cross sectional view of the exemplary closed clamshell electronic device 300 depicted in FIG. 6 in an illustrative second position, along line 6B-6B according to one or more embodiments. In one or more embodiments, the keyboard member 130 can be continuously translated by the user from a first position to a second position disposed at any point within the range of linear motion of the keyboard member 130. In one or more embodiments, as the keyboard member 130 is translated across the base member 110, the support member 160 can simultaneously pivot or otherwise rotate at its first end 165 about the first hinge 120 and/or at its second end 170 about the third hinge 310.

As the support member 160 rotates about the first hinge 120, the support member 160 can form an angle 340 measured with respect to the base member 110. Since the support member 160 is at an angle with respect to the display member 150, in one or more embodiments, the support member 160 can transmit all or a portion of the force exerted by the user on the display member 150 to the base member 110. In one or more embodiments, the transmission of all or a portion of the force applied to the display member 150 to the base member 110 via the support member 160 can minimize the tendency for the portable electronic device 300 to overturn due to the force applied by the user to the display member 150.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A clamshell electronic device comprising:
a base member having a first hinge disposed thereupon;
   wherein the first hinge defines a first centerline along the axis of rotation of the first hinge;
a keyboard member having a second hinge disposed thereupon;
   wherein the second hinge defines a second centerline along the axis of rotation of the second hinge;
   wherein the keyboard member is slideably connected to the base member;
   wherein the keyboard member is continuously, reversibly slideable from a first position to a second position; and
   wherein the first and second centerlines are axially aligned with one another when the keyboard member is in the first position;
a display member, pivotably connected to the keyboard member via the second hinge; and
a rigid support member having a first end and a second end, wherein the first end is pivotably connected to the base member via the first hinge, and wherein the second end is pivotably connected to the display member via a third hinge.

2. The apparatus of claim 1, wherein at least a portion of the support member is disposed at least partially within a recessed portion of the display member when the keyboard member is in the first position.

3. The apparatus of claim 1, wherein the support member forms an angle of from about 30° to about 90° with respect to the base member when the keyboard member is disposed in the second position.

4. The apparatus of claim 1, wherein the base member comprises an at least partially hollow member having at least one electronic device disposed therein; and
   wherein the at least one electronic device is selected from a group of electronic devices consisting of: a central processing unit (CPU); a solid state drive (SSD); a hard disk drive (HDD); electrostatic memory, including EEPROM memory, ROM memory, RAM memory; a compact disc (CD) drive; a digital versatile disk (DVD) drive; and a Blu-ray® disc drive.

5. The apparatus of claim 1, wherein the keyboard member comprises an at least partially hollow member having at least one input device disposed thereupon;
   wherein the at least one input device is adapted for receiving input from an external source; and
   wherein the at least one input device is selected from a group of input devices consisting of: a keyboard, and a pointing device including a touchpad pointing device, a joystick pointing device, and a trackball pointing device.

6. The apparatus of claim 1, wherein the display member comprises an at least partially hollow member having at least one output device at least partially disposed therein;
   wherein at least a portion of the at least one output device is exposed; and
   wherein the at least one output device is selected from a group of output devices consisting of: a cathode ray tube (CRT) display; a light emitting diode (LED) display; an organic LED (OLED) display; a gas plasma display; and a liquid crystal display (LCD).

7. The apparatus of claim 1, wherein the display member comprises an at least partially hollow member having at least one input/output (I/O) device at least partially disposed therein;
   wherein at least a portion of the at least one I/O device is exposed; and
   wherein the at least one I/O device is selected from a group of I/O devices consisting of: a digitizer input; a pen-sensitive cathode ray tube (CRT) display; a pen-sensitive light emitting diode (LED) display; a pen-sensitive organic LED (OLED) display; a pen-sensitive gas plasma display; a pen-sensitive liquid crystal display (LCD); a touch sensitive cathode ray tube (CRT) display; a touch sensitive light emitting diode (LED) display; a touch sensitive organic LED (OLED) display; a touch sensitive gas plasma display; and a touch sensitive liquid crystal display (LCD).

8. The apparatus of claim 1, wherein the base member, the keyboard member, the display member, and the support member are stackable when the keyboard member is in the first position;
   wherein the keyboard member covers at least a portion of the base member;
   wherein the display member covers at least a portion of the keyboard member; and
   wherein the support member covers at least a portion of the display member.

9. The apparatus of claim 1, wherein the display member forms an angle of from about 0° to about 180° with respect to the base member when the keyboard member is in the first position.

10. A clamshell electronic apparatus, comprising:
at least one first hinge adapted to pivotably connect a base member to a support member along a first centerline defined by the axis of rotation of the at least one first hinge;
   wherein the support member comprises a rigid member having a first end and a second end;
at least one slideable connector adapted to slideably connect a keyboard member to the base member;
   wherein the keyboard member is continuously, reversibly, slideable between a first position and a second position;
at least one second hinge adapted to pivotably connect a display member to the keyboard member along a second centerline defined by the axis of rotation of the at least one second hinge;
   wherein the first centerline and the second centerline are axially aligned with one another when the keyboard member is disposed in the first position; and
at least one third hinge adapted to pivotably connect the second end of the support member to the display member.

11. The apparatus of claim 10, wherein at least a portion of the support member is disposed at least partially within a recessed portion of the display member when the keyboard member is in the first position.

12. The apparatus of claim 10, wherein the support member forms an angle of from about 30° to about 89° with respect to the base member with the keyboard member in the second position.

13. The apparatus of claim 10, wherein the base member comprises an at least partially hollow member having at least one electronic device disposed therein; and
   wherein the at least one electronic device is selected from a group of electronic devices consisting of: a central processing unit (CPU); a solid state drive (SSD); a hard disk drive (HDD); electrostatic memory, including EEPROM memory, ROM memory, RAM memory; a compact disc (CD) drive; a digital versatile disk (DVD) drive; and a Blu-ray® disc drive.

14. The apparatus of claim 10, wherein the keyboard member comprises an at least partially hollow member having at least one input device disposed thereupon;
   wherein the at least one input device is adapted for receiving input from an external source; and
   wherein the at least one input device is selected from a group of input devices consisting of: a keyboard, and a pointing device including a touchpad pointing device, a joystick pointing device, and a trackball pointing device.

15. The apparatus of claim 10, wherein the display member comprises an at least partially hollow member having at least one output device at least partially disposed therein;
   wherein at least a portion of the at least one output device is exposed; and
   wherein the at least one output device is selected from a group of output devices consisting of: a cathode ray tube (CRT) display; a light emitting diode (LED) display; an organic LED (OLED) display; a gas plasma display; and a liquid crystal display (LCD).

16. The apparatus of claim 10, wherein the display member comprises an at least partially hollow member having at least one input/output (I/O) device at least partially disposed therein;
   wherein at least a portion of the at least one I/O device is exposed; and
   wherein the at least one I/O device is selected from a group of I/O devices consisting of: a digitizer input; a pen-sensitive cathode ray tube (CRT) display; a pen-sensitive light emitting diode (LED) display; a pen-sensitive organic LED (OLED) display; a pen-sensitive gas plasma display; a pen-sensitive liquid crystal display (LCD); a touch sensitive cathode ray tube (CRT) display; a touch sensitive light emitting diode (LED) display; a touch sensitive organic LED (OLED) display; a touch sensitive gas plasma display; and a touch sensitive liquid crystal display (LCD).

17. The apparatus of claim 10, wherein the base member, the keyboard member, the display member, and the support member are stackable when the keyboard member is in the first position;
   wherein the keyboard member covers at least a portion of the base member;
   wherein the display member covers at least a portion of the keyboard member; and
   wherein the support member covers at least a portion of the display member.

18. The apparatus of claim 10, wherein the electronic apparatus comprises a portable computing device;
   wherein the base member comprises an at least partially hollow member having a central processing unit (CPU) at least partially disposed therein;
   wherein the keyboard member comprises an at least partially hollow member having a keyboard and a pointing device at least partially disposed thereon;
   wherein the display member comprises an at least partially hollow member having a touch sensitive liquid crystal display (LCD) at least partially disposed therein.

19. A clamshell portable computer housing, comprising:
   an at least partially hollow, generally rectangular parallelepiped, base member having generally planar upper, lower, and side surfaces;
      wherein the upper and lower surfaces have a greater surface area than the side surfaces;
      wherein at least one central processing unit (CPU) is at least partially disposed therein;
      wherein a first hinge is disposed on the upper surface of the base member, at least a portion of the first hinge proximate at least one of the side surfaces of the base member; and
      wherein a first centerline is formed along the axis of rotation of the first hinge;
   an at least partially hollow, generally rectangular parallelepiped, keyboard member having generally planar upper, lower, and side surfaces;
      wherein a keyboard and a pointing device is at least partially disposed on the upper surface of the keyboard member;
      wherein the upper and lower surfaces correspond generally in size to the upper surface of the base member;
      wherein at least a portion of the lower surface of the keyboard member is disposed proximate at least a portion of the upper surface of the base member;
      wherein the keyboard member is slideably connected to the base member;
      wherein the keyboard member is continuously, reversibly slideable from a first position to a second position; and
      wherein a second hinge is disposed on the upper surface of the keyboard member, at least a portion of the second hinge proximate at least one of the side surfaces of the keyboard member;
   an at least partially hollow, generally rectangular parallelepiped, a display member having generally planar upper, lower, and side surfaces;
   wherein the first centerline is axially aligned with a second centerline defined by the axis of rotation of the second hinge when the keyboard member is disposed in the first position;
      wherein a liquid crystal display (LCD) is at least partially disposed within the display member;
         wherein the LCD is selected from a group of LCDs consisting of: a pen-input LCD; a touch-sensitive LCD; and a digitizer input LCD;
      wherein the upper and lower surfaces correspond generally in size to the upper surface of the keyboard member;
      wherein the display member is pivotably connected to the keyboard member via the second hinge; and
   a rigid support member having a first end and a second end;
      wherein the first end is pivotably connected to the base member via the first hinge;
      wherein the second end is pivotably connected to the display member via a third hinge;
      wherein at least a portion of the support member is disposed at least partially within a recessed portion of the display member when the keyboard member is in the first position; and
      wherein the support member forms an angle of from about 30° to about 89° with respect to the base member with the keyboard member in the second position.

20. The housing of claim 19, wherein the base member, the keyboard member, the display member, and the support member are stackable when the keyboard member is in the first position;
   wherein the keyboard member covers at least a portion of the base member;
   wherein the display member covers at least a portion of the keyboard member; and
   wherein the support member covers at least a portion of the display member.

* * * * *